United States Patent [19]

Feygin

[11] Patent Number: 4,752,352

[45] Date of Patent: Jun. 21, 1988

[54] APPARATUS AND METHOD FOR FORMING AN INTEGRAL OBJECT FROM LAMINATIONS

[76] Inventor: Michael Feygin, 6832 N. Ashland Ave., Chicago, Ill. 60626

[21] Appl. No.: 40,361

[22] Filed: Apr. 17, 1987

Related U.S. Application Data

[63] Continuation-in-part of Ser. No. 872,102, Jun. 6, 1986, abandoned.

[51] Int. Cl.⁴ .......................... B44C 1/22; C23F 1/02; B32B 31/00; C03C 15/00
[52] U.S. Cl. ................................. 156/630; 29/430; 29/432.1; 29/467; 29/791; 29/DIG. 4; 29/DIG. 16; 156/59; 156/154; 156/264; 156/272.8; 156/345; 156/512; 156/517; 156/634; 156/645; 156/659.1; 219/121 LJ; 219/121 LP; 219/121 LM; 264/109; 264/241; 428/548; 428/599
[58] Field of Search ................... 156/58, 59, 153, 154, 156/264, 265, 272.8, 345, 512, 517, 630, 634, 643, 656, 645, 659.1; 29/430, 432.1, 467, 791, DIG. 4, DIG. 16; 425/175, 346, DIG. 30; 219/121 L, 121 LM, 121 LG, 121 LN, 121 LP, 121 LJ; 264/109, 241; 428/548, 599, 603

[56] References Cited

U.S. PATENT DOCUMENTS

| | | | |
|---|---|---|---|
| 3,280,230 | 10/1966 | Bradshaw et al. | 156/264 X |
| 3,301,725 | 1/1967 | Frontera | 156/59 |
| 3,539,410 | 11/1970 | Meyer | 156/58 |
| 3,932,923 | 1/1976 | DiMatteo | 156/264 X |
| 4,575,330 | 3/1986 | Hull | 156/58 X |

Primary Examiner—William A. Powell
Attorney, Agent, or Firm—Wood, Dalton, Phillips, Mason & Rowe

[57] ABSTRACT

An apparatus and method for forming an integral three-dimensional object from laminations of the same or gradually varying shape. The apparatus includes a supply station, a work station for forming a material into a plurality of laminations for the three-dimensional object, a control station for directing the operation of the work station, an assembling station for stacking the laminations in sequence into the three-dimensional object, and bonding the laminations to complete the formation of the three-dimensional object. The method includes the steps of providing a work station for forming the laminations for the three-dimensional object, providing the material which can be a bimaterial composite, providing a control station for directing the operation of the work station, entering data concerning the three-dimensional object at the control station, instructing the control station to direct the operation of the work station, assembling the laminations in sequence into the form of the three-dimensional object, and integrally bonding the laminations to complete the formation of the integral three-dimensional object. By following the method, a unique three-dimensional object formed of individually contoured laminations of the same or gradually varying shape is obtained.

80 Claims, 5 Drawing Sheets

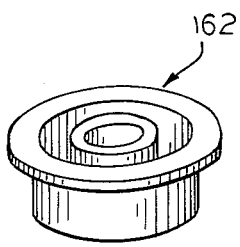
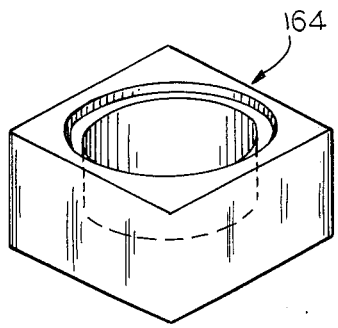
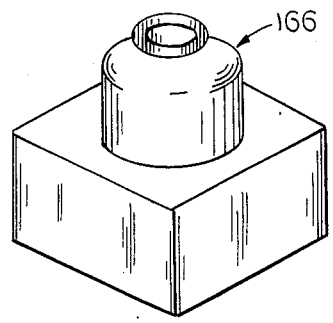
FIG.1A  FIG.1B  FIG.1C
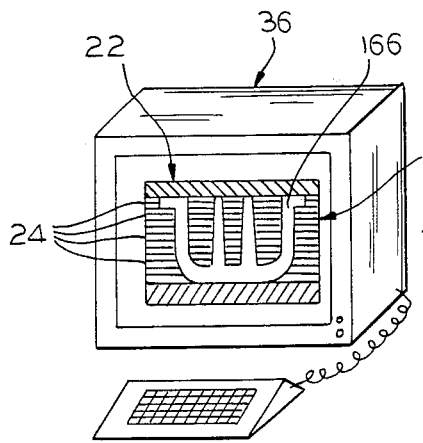
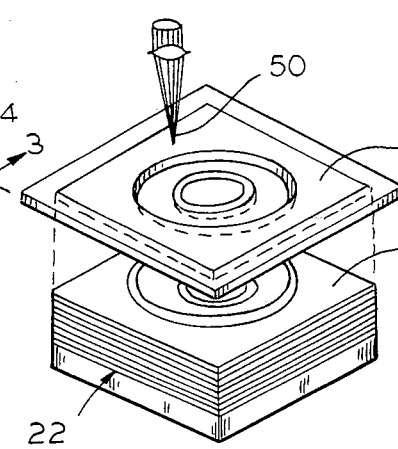
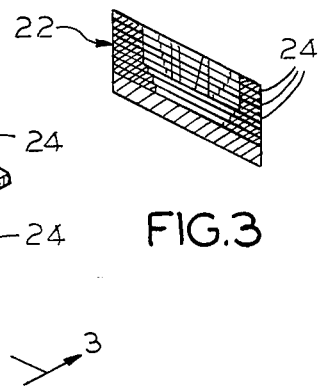
FIG.2A  FIG.2B  FIG.3
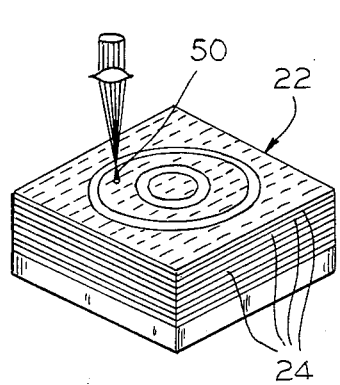
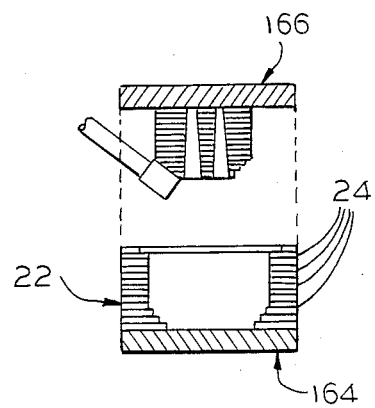
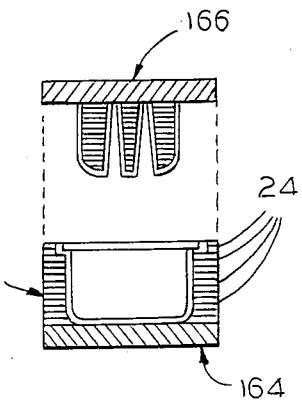
FIG.4  FIG.5  FIG.6

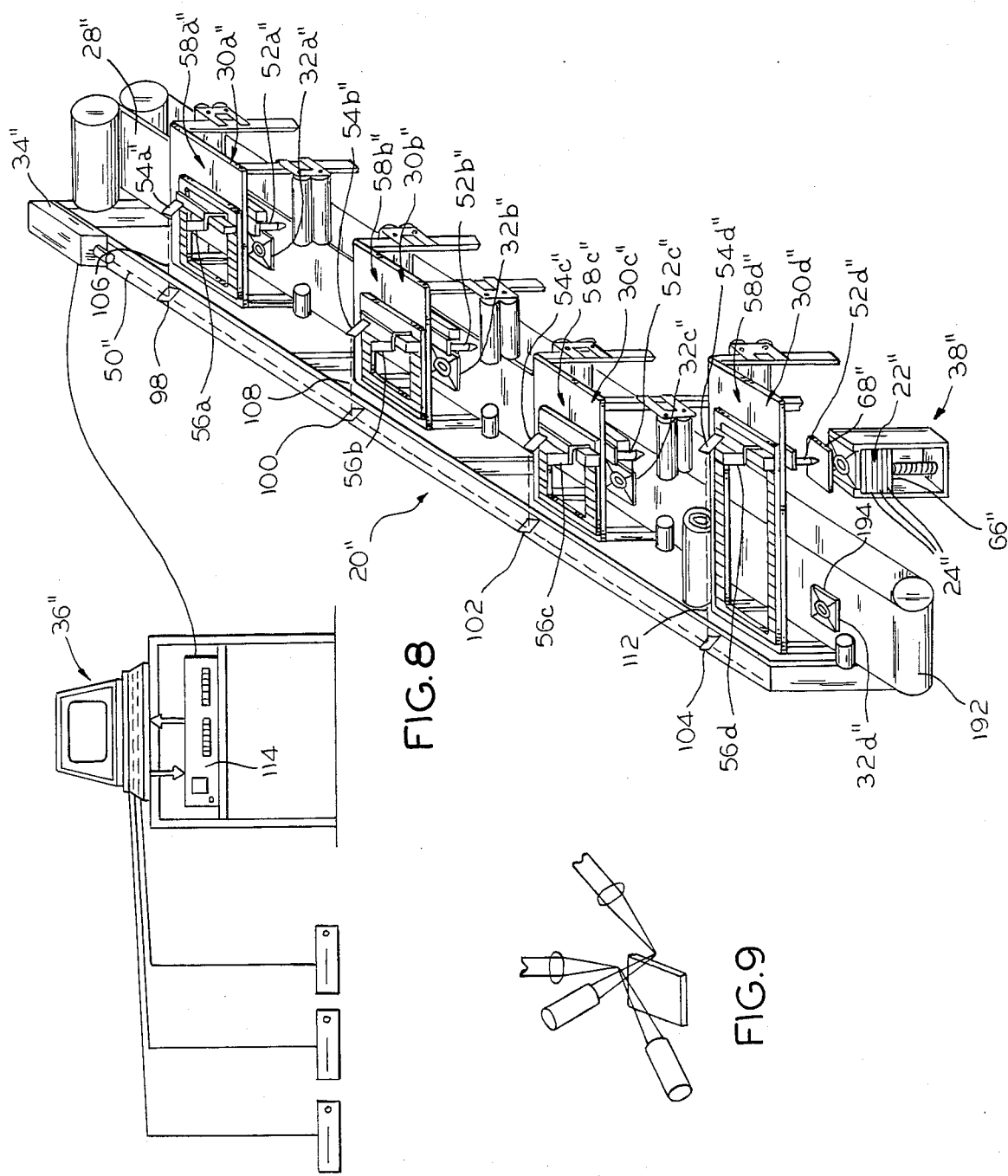

APPARATUS AND METHOD FOR FORMING AN INTEGRAL OBJECT FROM LAMINATIONS

RELATED APPLICATION

This application is a continuation-in-part of application Ser. No. 872,102, filed June 6, 1986, now abandoned.

FIELD OF THE INVENTION

The present invention generally relates to manufacturing apparatus, methods of manufacture, and products manufactured thereby and, more particularly, to an integral three-dimensional object formed from individually contoured laminations of the same or gradually varying shape.

BACKGROUND OF THE INVENTION

Recently, there has been much discussion concerning the feasibility of building a flexible system for automatic manufacturing of three-dimensional dies, molds, prototypes and products. Although it is presently possible to develop information about a flat figure or a three-dimensional object in a computer memory and then have that figure or object reproduced in two-dimensional fashion on a piece of paper by incremental movements of a plotter pen, it is not yet possible to actually produce the object in three-dimensions in the same manner. Nevertheless, it would be highly desirable to produce three-dimensional objects from existing computer assisted design systems (CAD systems), since among the benefits to be derived would be reduction in expense and increase in efficiency.

Based upon a consideration of the features of CAD systems, it does not at first appear that there is any logical manner for producing three-dimensional objects of gradually varying shape. Upon further investigation, however, a three-dimensional object might be producible utilizing thin plane cross-sections of a solid body as its building blocks with each of the cross-sections being cut or formed separately. Each cross-section could be cut or formed by a laser located on a positioning "plotter-like" table, or by some other technique such as chemical etching, and then attached to another cross-section using a suitable bonding technique. In this manner, any complex three-dimensional object could be built once its design had been completed with the use of a CAD system.

With this method, only one machine and one tool would be needed for production of the three-dimensional object. The only software required for cross-section generation would be the one that already exists in modern CAD systems, and it would presumably work for any three-dimensional object. Being information intensive, this theoretical technique could easily be incorporated into knowledge-based engineering, design, or model-shop systems.

On a small scale, the three-dimensional production system for creation of prototypes can be established as a computer peripheral. It might also evolve into a device for manufacturing lightweight laminated composite parts which are finding widespread use in our energy-sensitive industrial environment. On a large scale, the three-dimensional production system can perform as a full flexible manufacturing system for making dies, molds, prototypes and products.

Certain discrete components of the suggested three-dimensional production system have been used in applications of various types. Unfortunately, until the present invention, there has been no practical means for combining three components and developing still additional needed components into a complete, workable system. For instance, while laser based manufacturing, CAD systems, and lamination processes are all known, it has remained to combine them into an integrated three-dimensional production system.

The power of lasers utilized in laser cutting machinery allows accurate cuts in metals up to 0.25 inches thick. Moreover, CNC-controlled contouring enables cutting of virtually any shape. The cutting speeds of such machinery can range from three thousand feet per minute for plastic films to as low as a few inches per minute for thick or high temperature metals. Similarly, the use of photo etching techniques to create numerous complex flat plates has been known for years, but has never been utilized as a portion of a technique for creating laminated three-dimensional objects. Also, CAD systems have gained enough sophistication to allow solid body representation. Moreover, some CAD systems can accumulate accurate three-dimensional information along with accommodating sectioning of solid objects. Additionally, some types of laminated dies held together mechanically by bolting or the like have been produced by conventional machining for many years. However, despite advances in lamination processes, it has remained to implement the advantages of automation in three-dimensional production.

The present invention is directed to overcoming the above stated problems and accomplishing the stated objects by providing a unique apparatus and method for forming a composite from laminations.

SUMMARY OF THE INVENTION

Accordingly, the present invention is directed to an apparatus and method for forming an integral three-dimensional object from laminations of the same or gradually varying shape. The apparatus includes a station for storing and supplying a material together with means for forming the material into a plurality of individually contoured laminations in shapes required for assembly in a preselected sequence into the three-dimensional object. It also includes means for controlling the operation of the lamination forming means to provide the individually contoured laminations for the three-dimensional object in response to data entered concerning the three-dimensional object and further includes means for assembling the plurality of individually contoured laminations formed from the material in the pre-selected sequence into the form of the three-dimensional object. The apparatus also includes means for integrally bonding each of the individually contoured laminations to the next adjacent of the individually contoured laminations. With the unique apparatus of the invention, the formation of an integral three-dimensional object from laminations of the same or gradually varying shape can be successfully completed.

In a preferred embodiment, a supply station houses rolls or containers of thin sheet-like material and the sheet-like material is a sheet metal ribbon. With this arrangement, the apparatus also preferably includes a feeding mechanism for advancing the ribbon from the rolls. In addition, the lamination forming means preferably includes a work station having a position for cutting the sheet-like material together with means for cutting the sheet-like material into the required shapes at the cutting position.

Preferably, the cutting means includes a laser beam generating device operatively associated with the work station, and also advantageously includes means for focusing a laser beam from the generating device onto the sheet-like material at the cutting position. Moreover, the apparatus preferably includes means for directing the laser beam from the generating device about the sheet-like material to form the required shapes at the cutting position.

In the preferred embodiment, the operation controlling means includes a computer assisted drafting station for entering data concerning the three-dimensional object. There is also provided means associated with the computer assisted drafting station for transferring operation controlling signals to the lamination forming means. Additionally, the operation controlling means includes means for determining the thickness, individual contours, sequence of forming, and sequence of assembling the individually contoured laminations into a single, permanently bonded three-dimensional object in a predetermined operating sequence.

In the preferred embodiment, the lamination assembling means includes an assembly station having a location for stacking the individually contoured laminations. It also preferably includes means for moving the individually contoured laminations from the cutting position of the work station to the stacking location of the assembly station. Specifically, the moving means is preferably an electromagnetically operated pick-up plate movable between the cutting position of the work station and the stacking location of the assembly station.

In an alternative embodiment, the moving means is a conveyor belt for transporting the individually contoured laminations from the cutting position of the work station to the stacking location of the assembly station. The sheet-like material in this embodiment is a sheet-like plastic ribbon having a pressure sensitive adhesive on the top thereof covered with a surface protecting tape. With this arrangement, the apparatus includes means for removing the tape before the plastic ribbon enters the cutting position of the work station.

In addition, the assembly station then comprises a stacking device including a movable plate at a stacking location. The plate is disposed on a stacking platform for axial movement to press individually contoured laminations assembled on the plate to the next adjacent individually contoured lamination carried from the cutting position of the work station to the stacking location of the assembly station. Preferably, a load cell is associated with the plate to ensure a force sufficient to cause an adhesive bond between the individually contoured laminations.

A further aspect of the apparatus of the present invention includes the availability of providing a plurality of work stations. In this respect, each work station has a position for cutting the sheet-like material and a single laser beam generating device is operatively associated with each of the work stations through a beam splitter and through means for directing and focusing laser beams from the beam splitters onto the sheet-like material at the respective cutting positions of the work stations. Moreover, a single assembly station having a location for stacking the individually contoured laminations from all of the work stations is provided.

In still a further embodiment, the lamination forming means includes a plotter for producing the required shapes as a negative image on a transparent sheet-like material for use as artwork in the chemical etching of the sheet-like material for the three-dimensional object. The sheet-like material of the three-dimensional object comprises a metal sheet coated with a photoresistant material for exposure to ultraviolet light. With this arrangement, the lamination forming means still further includes an etching station to receive the coated metal sheet selectively exposed to the ultraviolet light through the plotter generated artwork.

In yet another embodiment, the material stored and supplied at the station is a powder. The lamination forming means then includes a powder receiving platform, means for compressing the powder on the platform to a predetermined thickness, and means for integrally bonding at least some of the powder to complete formation of one of the individually contoured laminations. The lamination assembling means includes means for moving the powder receiving platform in cyclical fashion from the powder storing and supplying station to the powder compressing means and to the integral bonding means. Preferably, the powder compressing means includes a heated roller controlled by an actuator regulated to control the force of the roller on the powder to achieve bonding during compression.

The present invention is also directed to a unique method of forming an integral three-dimensional object from very thin laminations of the same or gradually varying shape. The method includes the step of providing means for forming a material into a plurality of individually contoured laminations in shapes required for assembly in a pre-selected sequence into the three-dimensional composite. It also includes the step of providing means for controlling the operation of the lamination forming means to provide the individually contoured laminations for the three-dimensional object. The method further includes the step of entering data concerning the three-dimensional object into the operation controlling means and thereafter instructing the operation controlling means to operate the lamination forming means in a controlled manner so as to form the plurality of individually contoured laminations. It also includes the step of assembling the plurality of individually contoured laminations in the pre-selected sequence into the form of the three-dimensional object. The method still further comprises the plurality of individually contoured laminations being assembled such that each of the individually contoured laminations is integrally bonded to the next adjacent of the individually contoured laminations. By following the steps of the method of the invention, the formation of the three-dimensional object from laminations can be successfully completed.

In yet another form of the invention, a unique method of forming an integral three-dimensional object from laminations is disclosed. The method includes the steps of positioning a platform under a station for storing and supplying a powder material, depositing a quantity of the powder material on the platform to form a layer of the powder material of a predetermined thickness, compressing the layer of the powder material to cause the powder material to be formed into a coherent mass, heating at least a portion of the layer of the powder material to form an individually contoured lamination, and repeating the depositing, compressing and heating steps to form a plurality of individually contoured laminations. By following the steps of this method, each of the individually contoured laminations is integrally bonded to the next adjacent of the individually contoured laminations by the heating steps.

Finally, the present invention is directed to an integral three-dimensional object formed from laminations by the unique method as set forth hereinabove.

Other objects, advantages and features of the present invention will become apparent from a consideration of the following specification when taken in conjunction with the accompanying drawings.

BRIEF DESCRIPTION OF THE DRAWINGS

In the drawings:

FIG. 1A is a perspective view of a product part to be made with a die or mold formed in accordance with the present invention;

FIG. 1B is a perspective view of one-half of a die or mold to be used to manufacture the product part of FIG. 1A;

FIG. 1C is a perspective view of the other half of a die or mold to be used to manufacture the product part of FIG. 1A;

FIG. 2A is a perspective view of a computer assisted drafting system for entering data concerning the product part and die or mold illustrated in FIGS. 1A–1C;

FIG. 2B is a perspective view illustrating the formation of individually contoured laminations for a three-dimensional object such as the die or mold illustrated in FIGS. 1B and 1C;

FIG. 3 is a cross-sectional view taken on the line 3—3 of FIG. 2B;

FIG. 4 is a perspective view illustrating the assembly of individually contoured laminations into an integral three-dimensional object such as the die or mold illustrated in FIGS. 1B and 1C;

FIG. 5 is a cross-sectional view schematically illustrating removing roughness from an integral three-dimensional object formed from individually contoured laminations such as the die or mold illustrated in FIGS. 1B and 1C;

FIG. 6 is a cross-sectional view schematically illustrating plating an integral three-dimensional object formed from individually contoured laminations such as the die or mold illustrated in FIGS. 1B and 1C;

FIG. 8 is a perspective view of an alternative embodiment of an apparatus for forming an integral three-dimensional object from laminations in accordance with the present invention;

FIG. 9 is a perspective of a sensor for locating edges of an individually contoured lamination during assembly of an integral three-dimensional object from laminations in accordance with the present invention;

DETAILED DESCRIPTION OF THE PREFERRED EMBODIMENTS

Figure 7:
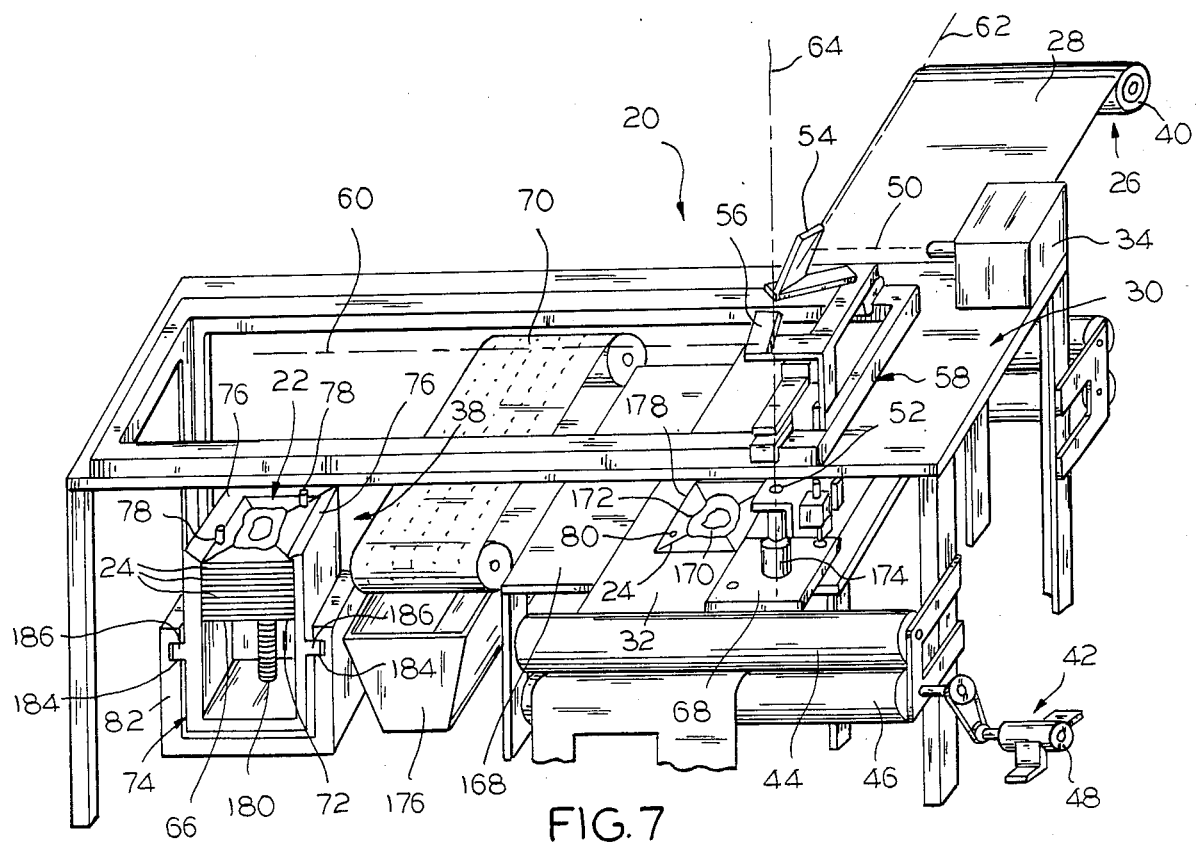
FIG. 7 is a perspective view of an apparatus for forming an integral three-dimensional object from laminations in accordance with the present invention.

Referring to FIG. 7, the reference numeral 20 designates generally an apparatus for forming an integral three-dimensional object 22 from laminations 24 of the same or gradually varying shape. The apparatus 20 includes a station 26 for storing and supplying a material 28 and means for forming the material 28 into a plurality of individually contoured laminations 24 in shapes required for assembly in a preselected sequence into the three-dimensional object 22. More particularly, the lamination forming means includes a work station 30 having a position 32 for cutting the material together with means for cutting the material 28 into the required shapes at the cutting position 32 such as the laser beam generating device 34 operatively associated with the work station 30. The apparatus 20 also includes means for controlling the operation of the work station 30 to provide the individually contoured laminations 24 for the three-dimensional object 22 in response to data entered concerning the three-dimensional object 22. More specifically, the operation controlling means includes a computer assisted drafting station 36 for entering data concerning the three-dimensional object 22 (see FIG. 2A). The apparatus 20 still further includes an assembly station 38 for assembling the plurality of individually contoured laminations 24 formed from the material 28 in the pre-selected sequence into the form of the three-dimensional object 22. With this arrangement, the individually contoured laminations 24 of the same or gradually varying shape can be integrally bonded to complete formation of the three-dimensional object 22.

In this connection, the apparatus 20 includes means for integrally bonding each of the individually contoured laminations 24 to the next adjacent of the individually contoured laminations 24 to complete the formation of the three-dimensional object 22. When the material 28 is a sheet-like material such as sheet metal ribbon, the integral bonding means comprises spot brazing the individually contoured laminations 24 at the assembly station 38 by utilizing the laser beam generating device 34 in a manner to be described hereinafter. Alternatively, if the sheet-like material 28 is of another material, such as a sheet-like plastic material, the integral bonding means will be selected to be compatible with the given material.

Still referring to FIG. 7, the supply station 26 is preferably a roll 40 for storing the sheet-like material 28. It will also be appreciated that, with this arrangement, the apparatus 20 will include a feeding mechanism 42 for advancing the sheet-like material 28 (such as a sheet metal ribbon) from the roll 40 through the work station 30, substantially as shown. By utilizing a pair of frictional drive rollers 44 and 46, together with a motor 48 for driving one of the rollers 46, the sheet-like material 28 can be fed through the cutting position 32 of the work station 30.

With the arrangement illustrated in FIG. 7, the cutting means also includes means for focusing a laser beam 50 from the generating device 34 onto the sheet-like material 28 at the cutting position 32. This preferably includes a lens 52 through which the laser beam 50 passes before reaching the sheet-like material 28 at the cutting position 32. The cutting means also includes means for directing the laser beam 50 from the generating device 34 about the sheet-like material 28 to form the required shapes at the cutting position 32. This preferably includes a pair of mirrors 54 and 56 adapted to direct the laser beam 50 from the generating device 34 through the lens 52. As shown, the mirrors 54 and 56 are spaced from the generating device 34, the lens 52, and one another.

In a preferred embodiment, the means for directing the laser beam 50 includes a positioning table 58 for supporting the mirrors 54 and 56 for axial movement along mutually perpendicular axes 60 and 62. The positioning table 58 supports one of the mirrors 54 for movement toward and away from the generating device 34 along the axis 60, and it also supports the other of the mirrors 56 for movement with the one of the mirrors 54. Additionally, the positioning table 58 supports the other of the mirrors 56 for movement toward and away from the one of the mirrors 54 along the axis 62.

As will be appreciated from FIG. 7, the mirrors 54 and 56 move in a plane generally parallel to the plane of the sheet-like material 28 at the cutting position 32. It will also be seen that the positioning table 58 supports the lens 52 for movement with the other of the mirrors 56 such that the lens 52 is adapted to move with the mirrors 54 and 56 in a plane generally parallel to the plane of the mirrors. Moreover, the lens 52 is also supported for movement along an axis 64 generally perpendicular to the plane of the mirrors 54 and 56.

As previously mentioned, the lamination assembling means includes an assembly station 38 having a location 66 for stacking the individually contoured laminations 24. It will also be appreciated that means are provided for moving the individually contoured laminations 24 from the cutting position 32 of the work station 30 to the stacking location 66 of the assembly station 38. In the embodiment illustrated in FIG. 7, the moving means is an electromagnetically operated pick-up plate 68 movable between the cutting position 32 of the work station 30 and the stacking location 66 of the assembly station 38.

As shown, the apparatus 20 preferably includes a grinding belt 70 intermediate the cutting position 32 of the work station 30 and the stacking location 66 of the assembly station 38. The pick-up plate 68 is adapted to place the individually contoured laminations 24 in contact with the grinding belt 70 during movement from the cutting position 32 of the work station 30 to the stacking location 66 of the assembly station 38. In this manner, any rough edges created during cutting can be removed between the cutting position 32 of the work station 30 and the stacking location 66 of the assembly station 38.

Also as shown, the assembly station 38 includes a spring biased stacking plate 72 at the stacking location 66 disposed for axial movement in a stack holder 74 adapted to receive and retain the individually contoured laminations 24. The stack holder 74 is adapted for limited movement in a plane parallel to the plane of the stacking plate 72 and includes at least one retaining lip 76, and preferably a pair of retaining lips, adapted to cooperate with the spring biased stacking plate 72 to retain the individually contoured laminations 24 therebetween. With this construction, the individually contoured laminations 24 each have an identical generally rectangular outer contour and the stacking plate 72, stack holder 74, and retaining lips 76 cooperate with the generally rectangular contour to assemble the individually contoured laminations 24 into the form of the three-dimensional object 22.

Preferably, the stacking plate 72 includes a pair of locating pins 78 adapted to precisely position the individually contoured laminations 24 into the form of the three-dimensional object 22. For this purpose, the individually contoured laminations 24 each have a pair of pin-receiving locating holes 80 (see FIG. 12) in the generally rectangular outer contour outwardly of any inner contour such as 82.

Referring once again to FIG. 7, the electromagnetically operated pick-up plate 68 is operatively associated with the lens supporting portion 52 of the positioning table 58. The pick-up plate 68 is adapted to be placed in contact with the individually contoured laminations 24 at the cutting position 32 of the work station 30 to be electromagnetically attached thereto, and the positioning table 58 is adapted to move the individually contoured laminations from the cutting position 32 of the work station 30, first, to the grinding belt 70 and, next, to the stacking location 66 of the assembly station 38. Thereafter, the individually contoured laminations 24 are adapted to be released from the pick-up plate 68 and are adapted to be spot brazed with the laser beam generating device 34 at the stacking location 66 of the assembly station 38.

Figure 14:
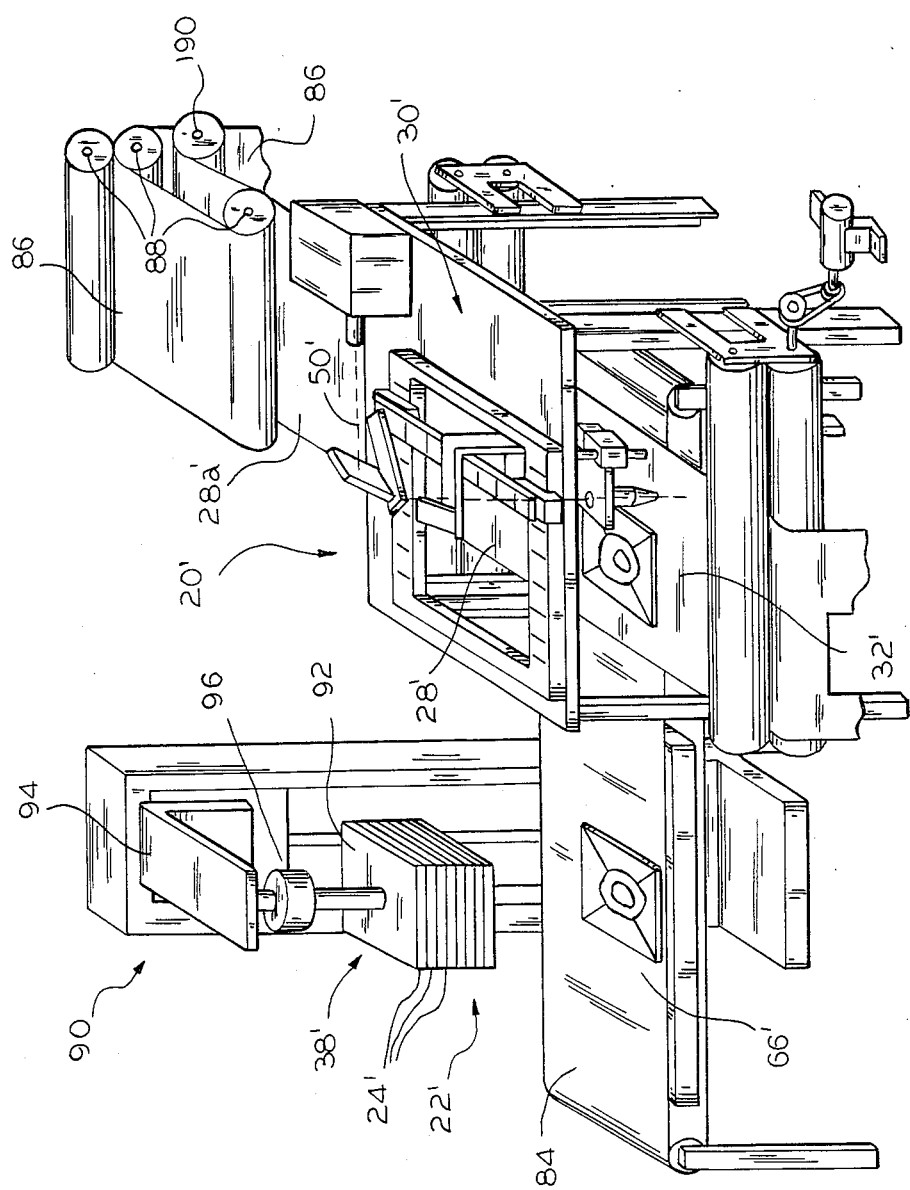
FIG. 14 is a perspective view of still another embodiment of apparatus for forming an integral three-dimensional object from laminations in accordance with the present invention.

In an alternative embodiment illustrated in FIG. 14, the apparatus 20' has a conveyor belt 84 for directly transporting the individually contoured laminations 24' from the cutting position 32' of the work station 30' to the stacking location 66' of the assembly station 38'. The sheet-like material 28' is preferably a sheet-like plastic ribbon having a pressure sensitive adhesive on the top 28a' thereof covered with a surface protecting tape 86, although it is also contemplated that the sheet-like plastic ribbon may be provided without a pre-coated adhesive in which case the apparatus 20' would include a coating station where a thin layer of adhesive would be applied to the ribbon prior to cutting. With the former type of material, the apparatus 20' includes means such as a roller 88 for removing the tape 86 before the plastic ribbon 28' enters the cutting position 32' of the workstation 30'.

Still referring to FIG. 14, the assembly station 38' comprises a stacking device 90 including a movable plate 92 at the stacking location 66'. The plate 92 is disposed on a stacking platform 94 for axial movement to press individually contoured laminations 24' assembled on the plate 92 to the next adjacent individually contoured lamination 24' carried from the cutting position 32' of the workstation 30' to the stacking location 66' of the assembly station 38'. Moreover, as shown, a load cell 96 is associated with the plate 92 to ensure a force sufficient to cause an adhesive bond between the individually contoured laminations 24'.

In still one other alternative embodiment illustrated in FIG. 8, the lamination forming means includes a plurality of workstations 30a'', 30b'', 30c'', 30d'', etc., each having a position 32a''', 32b''', 32c''', 32d''' etc., for cutting the sheet-like material 28'' into the required shapes at their respective cutting positions. The cutting means may include a single laser beam generating device 34'' operatively associated with each of the workstations 30a'', 30b'', 30c'', 30d'', etc. through beam splitters 98, 100, 102, 104, etc. together with means for directing and focusing laser beams 106, 108, 110, 112, etc. from the beam splitters 98, 100, 102, 104, etc. onto the sheet-like material 28'' at the cutting positions 32a''', 32b''', 32c''', 32d''' etc. With this arrangement, the apparatus 20'' offers high speed formation of an integral three-dimensional object 22'' from a plurality of individually contoured laminations 24''.

Still referring to FIG. 8, the means for directing and focusing the laser beams 106, 108, 110, 112 etc. includes a pair of mirrors and a lens supported for movement at each of the positioning tables 58a'', 58b'', 58c'', 58d'' etc. The positioning tables 58a'', 58b'', 58c'', 58d'', etc. preferably include respective pairs of mirrors 54a'' and 56a'', 54b'' and 56b'', 54c'' and 56c'', 54d'' and 56d'', and respective lenses 52a'', 52b'', 52c'', 52d'' etc., all of which operate in the manner described in detail in connection with corresponding components of the single positioning table 58 illustrated in FIG. 7, with the exception that the mirrors 54a'', 54b'', 54c'', 54d'' etc. are movable toward and away from the perspective beam splitters 98, 100, 102, 104, etc. rather than with respect to the laser beam generating device 34''. With this arrangement, a plurality of individually contoured laminations 24' can be cut simultaneously at the respective workstations 30a'', 30b'', 30c'', 30d'' etc. to expedite the formation of the three-dimensional object 22''.

As shown in FIG. 8, the lamination assembling means includes a single assembly station 38'' having a location 66'' for stacking the individually contoured laminations 24'' from all of the workstations 30a'', 30b'', 30c'', 30d' etc. In addition, the apparatus 20'' includes means such as the electromagnetically operated pick-up plate 68'' for moving the individually contoured laminations 24'' from the cutting positions 32a''', 32b''', 32c''', 32d''' etc. of the workstations 30a'', 30b'', 30c'', 30d'' etc. to the stacking location 66'' of the single assembly station 38''.

Still referring to FIG. 8, the apparatus 20'' includes a computer assisted drafting station 36'' for entering data concerning the three-dimensional object 22'' together with means associated with the computer assisted drafting station 36'' for transferring operation controlling signals to the work stations 30a'', 30b'', 30c'', 30d'. In particular, the signal transferring means preferably comprises a multiplexer 114 that is operatively associated both with the computer assisted drafting station 36'' and with the work stations 30a'', 30b'', 30c'', 30d'' etc. in conventional fashion and the computer assisted drafting station 36'' is provided with software for determining the thickness of the individually contoured lamination 24'', for determining the individual contours of the individually contoured laminations 24'' for determining the sequence of forming the individually contoured laminations 24'' and for determining the sequence of assembling the individually contoured laminations 24'' into the three-dimensional object 22''. With this arrangement, the computer assisted drafting station 36'' is operative to insure for each of the individually contoured laminations 24'' that, after the thickness and individual contours have been determined, the sequence of forming the individually contoured laminations 24'' is such that each of the individual contours does not contain any other included contour.

While not specifically shown, it will be understood and appreciated that a similar computer assisted drafting station will be utilized with either of the embodiments illustrated in FIGS. 7 and 14, as well.

In still another embodiment, the lamination forming means includes a plotter 116 (FIG. 10) for producing the required shapes as negative images on a separate transparent sheet-like material 118 for use as artwork in the chemical etching process. The sheet-like material 118 is supplied to the plotter 116 from a supply station housing rolls or containers of the material. Referring now to FIG. 11, the use of the plotter generated artwork in a chemical etching process can be understood. The sheet-like material 120 for the three-dimensional object 22 comprises a bi-metallic strip of thin metal coated with a photoresistent material for exposure to ultraviolet light. As will be appreciated, the sheet-like material 120 must be thin in relation to the overall size of the three-dimensional object 22 so that gradual changes in the three-dimensional geometry can be reproduced in the laminating process.

Still referring to FIG. 11, the apparatus 122 supplies the sheet-like material 120 from the roll 124 to the station 126 where selective exposure to ultraviolet light occurs. At this station 126, the sheet-like material 118 with the plotter generated artwork is gradually unwound from the roll 128 and rewound onto the roll 130 as the sheet-like material 120 moves under the artwork at the same speed for exposure to the ultraviolet light through the artwork from the source 132. Preferably, the speed of the artwork on the sheet-like material 118 and the speed of the sheet-like material 120 is equalized through use of a series of conventional sprockets (not shown) cooperating with respective mating perforations 134.

It should be understood that the artwork could be created by the plotter on a transparent film attached to the metal ribbon prior to the plotting and ultraviolet light exposure. In another version of this method the artwork could be created by the plotter directly on the surface of the metal precovered by photoresistant material.

After the exposure to ultraviolet light, a chemical etching solution is sprayed onto the sheet-like material 120 from a nozzle 136. Individually contoured laminations then drop onto a conveyor 138. At this point, the conveyor 138 moves the individually contoured laminations such as 140a, 140b, 140c, and 140d to a washing station where washing solution is sprayed from a nozzle 142.

In order to fully utilize the bi-metallic material, more than one cross section such as 140a, 140b, 140c, 140d can be produced in any given row with each row of etched and washed individually contoured laminations such as 140a and 140b being transported by the conveyer 138 to another conveyor 144 preferably moving generally transversely of the direction of the conveyor 138. After accepting a new row of individually contoured laminations such as 140a and 140b, the conveyor 148 advances to allow space for another row of individually contoured laminations such as 140c and 140d and to advance the first row of individually contoured laminations onto the stack as at 150 with the unused bi-metallic material being rewound onto a roll 152.

Figure 13:
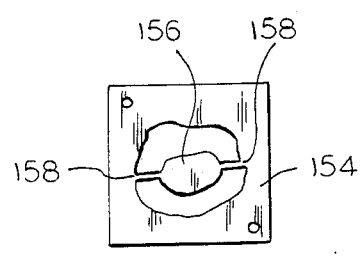
FIG. 13 is a plan view illustrating a method for attachment of non-contiguous cross section portions.

Referring to FIG. 13, a method of attachment for non-contiguous portions of the same cross section can be understood. Portions 154 and 156 are connected by means of the thin strips 158. After stacking individually contoured laminations and brazing them together, the thin strips 158 can be removed by using conventional machining techniques.

Figure 12:
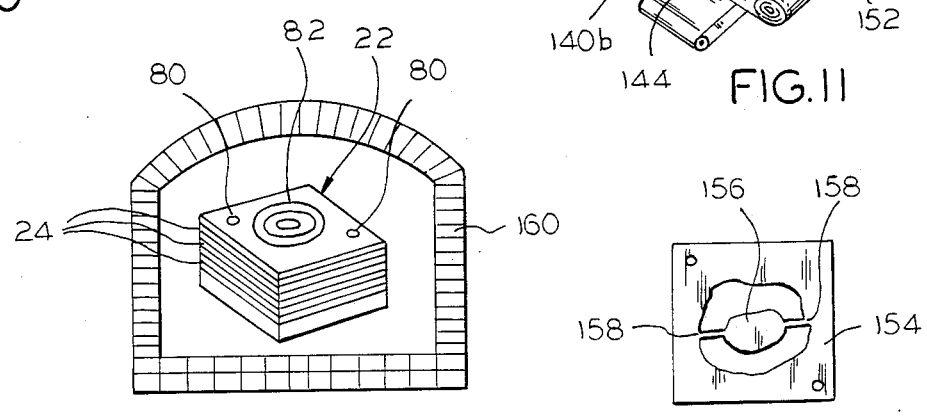
FIG. 12 is a schematic illustration of furnace brazing to complete formation of an integral three-dimensional object formed of individually contoured laminations in accordance with the present invention.

Referring to FIG. 12, the pin-receiving locating holes 80 an either be chemically etched or laser cut in the individually contoured laminations 24. This is, of course, done to properly align the inner contours such as 82 during the furnace brazing process in a brazing furnace such as 160. As with the embodiment described in FIG. 7, the alignment is aided by the cooperation of two locating pins such as 78 adapted to protrude through the locating holes 80.

Referring to FIGS. 1A–1C, one application of the present invention can be understood. It will be seen that a product part 162 is illustrated in FIG. 1A with two die or mold halves 164 and 166 for making the product part 162 being illustrated in FIGS. 1B and 1C. With this information, the die or mold halves 164 and 166 can be created from laminations in accordance with the present invention.

In particular, the die or mold design is first created on the computer assisted drafting station 36 (see FIG. 2A). Next, the laser beam 50 is manipulated to cut the individually contoured laminations 24 and the laminations are joined to form the three-dimensional object 22 (see FIGS. 2B and 3). Then, the individually contoured laminations 24 are spot brazed by means of the laser beam 50 and thereafter furnace brazed to complete formation of the three-dimensional object 22 (see FIG. 4). Finally, any roughness of the die or mold halves 164 and 166 is removed by means such as grinding (see FIG. 5), and the die or mold halves 164 and 166 are plated, if desired (see FIG. 6).

As will be appreciated from this description and the schematic it describes, the present invention provides a unique method of forming an integral three-dimensional object from laminations. The method includes the step of providing means for forming a material into a plurality of individually contoured laminations in shapes required for assembly in a pre-selected sequence into the three-dimensional object. It also includes the step of providing means for controlling the operation of the lamination forming means to provide the individually contoured laminations for the three-dimensional object. The method further includes the step of entering data concerning the three-dimensional object into the operation controlling means and thereafter instructing the operation controlling means to operate the lamination forming means in a controlled manner so as to form the plurality of individually contoured laminations. It also includes the step of assembling the plurality of individually contoured laminations in the pre-selected sequence into the form of the three-dimensional object. The method still further comprises the plurality of individually contoured laminations being assembled such that each of the individually contoured laminations is integrally bonded to the next adjacent of the individually contoured laminations to complete formation of the three-dimensional object. With these steps, a unique three-dimensional object formed from individually contoured laminations results.

As will be appreciated, the lamination forming means preferably is configured in accordance with the details of the embodiments described hereinabove. It is also advantageous for the operation controlling means to be similarly configured and to have like features for maximizing the benefits to be gained by following the method of the present invention. By so doing, the operation controlling means is capable of operating the lamination forming means in the necessary controlled manner.

With regard to the assembling step, it preferably includes providing a location for stacking the individually contoured laminations. The individually contoured laminations are then moved from the cutting position of the work station to the stacking location. After moving, the individually contoured laminations are stacked into the form of the three-dimensional object.

Preferably, if burrs are formed during the cutting operation, the method includes the step of grinding the individually contoured laminations after cutting the required shapes at the cutting position of the workstation. This is done to remove any roughness caused by the cutting step although it will be appreciated that this will not be necessary in the case of the chemical etching process since no burrs will be formed. As will be appreciated from the embodiment of FIG. 7, the grinding step is performed when needed at a point in time prior to stacking the individually contoured laminations at the stacking locations.

With regard to the step of bonding the laminations, this preferably includes spot brazing each of the laminations to the next adjacent of the laminations to complete formation of the three-dimensional object, although this is not required in the chemical etching process. It also preferably includes thereafter furnace brazing the entire three-dimensional object, as shown in FIG. 12, after which the three-dimensional object becomes a unitary product, e.g., the two die or mold halves 164 and 166 are each a unitary portion of the overall die or mold for making the product part 162. After furnace brazing, the method preferably includes the step of grinding the three-dimensional object (see FIG. 5) and thereafter plating the three-dimensional object (see FIG. 6), although the grinding again may not be needed in the chemical etching process.

When the material is a sheet-like material such as, e.g., a sheet-like plastic ribbon having a pressure sensitive adhesive on the top, the method will include the step of removing the surface protecting tape over the pressure sensitive adhesive before the sheet-like plastic ribbon enters the cutting position of the workstation. The method will also include the step of pressing individually contoured laminations located at the stacking location to the next adjacent individually contoured lamination moved from the cutting position of the work station to the stacking location to cause an adhesive bond between the individually contoured laminations. While not limited to the apparatus that is illustrated in the embodiment of FIG. 14, it will be appreciated that this apparatus can be utilized to perform the unique method described.

Finally, the method can include the step of providing a plurality of work stations each having a position for cutting a sheet-like material along with the step of providing means for cutting the sheet-like material into the required shapes at the cutting positions. The cutting means will then include a single laser beam generating device operatively associated with each of the workstations through a beam splitter. Moreover, the cutting means will also include means for directing and focusing laser beams from the beam splitters onto the sheet-like material at the cutting positions of each of the workstations.

By utilizing the method of the invention, a unique three-dimensional object formed from individually contoured laminations can be provided. This is accomplished with a technique which can be utilized for production of complex three-dimensional parts, dies, molds, prototypes, products conventionally produced by machining, and even forming parts for reconstructive bone surgery, and involves creation and then lamination of the thin individually contoured laminations of the solid body using equipment such as computer assisted drafting stations, plotters, laser beam generating devices and the like. As a result, it is possible to significantly shorten the time between the design and the manufacturing stages, reduce labor costs, increase productivity and provide a flexible manufacturing system.

The principle of the flexible manufacturing system can now be understood. A sheet metal ribbon 28 is fed into the workstation 30 (see FIG. 7) from a roll 40 at a supply station 26 where the ribbon is made from 0.001–0.030 inch thick bimetallic material, e.g., steel clad with copper on the bottom or any other such materials having different melting temperatures, with the metal having the higher melting temperature constituting the thickest layer of the ribbon on the order of 70 to 98% and with the remainder, i.e., 2 to 30%, constituting the low melting temperature portion used for brazing the individually contoured laminations 24 together, and a laser beam 50 is generated and directed to a cutting position 32 by means of the mirrors 54 and 56 and the lens 52 attached to the positioning table 58. As noted before, the mirrors 54 and 56 are movable in the plane defined by the axes 60 and 62 and the lens 52 is movable along the axis 64 perpendicular thereto.

Similarly, the principle of the flexible manufacturing system can be understood by referring to FIG. 11. A sheet metal ribbon 120 is fed under the ultraviolet light source 132, the etching nozzle 136, and the washing nozzle 142 where the ribbon is again made from 0.001–0.030 inch thick bimetallic material, e.g., steel clad with copper on the bottom or any other such material having different melting temperatures, with the metal having the higher melting temperature again constituting the thickest layer of the ribbon on the order of 70 to 98% and with the remainder, i.e., 2 to 30%, constituting the low melting temperature portion used for brazing the individually contoured laminations 24 together, and the overall method is as previously described hereinabove. As noted before, the individually contoured laminations such as 140a, 140b, 140c, and 140d are deposited onto the stack 150 after completion of the chemical etching process.

Referring once again to FIG. 7, by utilizing the positioning table 58 to manipulate the laser beam 50, it is possible to cut an individually contoured lamination 24 for the three-dimensional object 22. The sequence of cutting is determined by the computer assisted drafting station software or the programmer in such a manner that portions of the cross-section cut first do not contain any other included contours to ensure that there is always a small gap between the portion of the sheet metal ribbon 28 cut and the table 168 upon which it drops after cutting. For example, when the individually contoured lamination 24 is being cut, the contour 170 must be cut first and the contour 172 must be cut after it.

When the individually contoured lamination 24 has been cut, the positioning table 58 moves the pick-up plate 68 above and in contact with the surface of the lamination 24. An electromagnet 174 is energized to attract the lamination 24 to the pick-up plate 68 and the lamination 24 is moved into contact with the moving grinding belt 70. By so doing, the dross created by the melting and resolidification of the metal at the bottom of the cut line is removed in this operation from the lamination 24.

As will be appreciated, the grinding belt 70 can also transport portions of the lamination 24 to be discarded into a scrap container 176. This will be helpful, for instance, when, instead of a mold or die, the system is used to create a part prototype where it may be desirable to discard the portion between the contours 170 and 172. For such applications, the apparatus 20 is well suited for assembling a plurality of individually contoured laminations 24 into an integral three-dimensional object 22.

More specifically, the contour 170 would be cut first, if necesary the dross would be removed with the grinding belt 70, and the contour 170 would be loaded onto the stacking platform 72. Next, the portion between the contours 170 and 172 would be discarded by first cutting the contour 172, then lifting it by means of the pick-up plate 68 and releasing it above the moving grinding belt 70 which will transport that portion to the scrap container 176. Finally, the outer rectangular contour 178 and the pin receiving locating holes 80 will be cut by means of the laser beam 50.

In the embodiment illustrated in FIG. 7, the outer rectangular contour 178 is important for stacking individually contoured laminations 24 in a manner accommodating accurate spot brazing. As was previously done with the inner contour 170, the outer rectangular contour 178 is picked up and positioned above the stack holder 74 after which it is pushed against the stack of individually contoured laminations 24 so that the spring 180 compresses. When the pick-up plate 68 returns to its upper position, the spring 180 pushes the stacking plate 72 until the individually contoured lamination 24 just loaded pushes against the retaining lips 76.

Because of the triangular shape of the lips 76, the stack of individually contoured laminations 24 can be pushed down but are prevented from being pushed up beyond the retaining lips 76. Thus, each lamination 24 ends up at the same level after its initial loading, i.e., the level of the retaining lips 76. After initial loading, the positioning table 58 positions the mirrors 54 and 56 where needed and positions the lens 52 within the focal distance from the just loaded lamination 24, and the system spot brazes the just loaded lamination 24 to the stack with short laser pulses.

As will be appreciated, spot brazing is needed only to hold the individually contoured laminations 24 together temporarily until furnace brazing at a later stage of assembly, although if each individually contoured lamintion 24 consists of a single piece of metal, the spot brazing step may be omitted.

While the positioning table 58 is precise enough to accurately locate the individually contoured laminations 24, the stacking process itself is aided by the two locating pins 78. These pins 78, which are located perpendicularly to the stacking plate 72, have conical ends and, when each individually contoured lamination 24 is pushed onto the stack, the pins 78 protrude through the locating holes 80. If the holes 80 are not perfectly concentric with the pins 78, their inner diameters press against the conical surfaces of the pins 78 to produce enough force to move the stack holder 74 with respect to the stack holder housing 182.

In this connection, the stack holder housing 182 has a pair of grooves 184 disposed in a generally horizontal plane. These grooves loosely receive a pair of tongues 186 projecting outwardly from the sides of the stack holder 74. With this construction, the tongues 186 support the stack holder 74 for limited movement with minimal friction in a generally horizontal plane.

After each of the individually contoured laminations 24 is spot brazed to the stack, the feeding mechanism 42 advances the sheet metal ribbon 28 and the cycle resumes.

After all of the individually contoured laminations 24 have been attached to form the three-dimensional object 22, the three-dimensional object 22 can be placed in the brazing furnace 160 (see FIG. 12). Unacceptable roughness after brazing can be eliminated by grinding (see FIG. 5) before the mold surface is coated (by using an electroless nickel process or other finishing technique) to achieve the desired tolerance and surface finish characteristics. In the case of a mold or die, both halves are laminated simultaneously in a single process, and cutting, dross removal, loading, and spot brazing are done by the same positioning table driven by a computer assisted drafting station.

Referring once again to the embodiment illustrated in FIG. 14, the apparatus 20' is well suited for making plastic three-dimensional prototypes under the principles described in detail hereinabove. The primary reason for using plastics is to reduce the needed laser power sufficiently to accommodate the use of a compact, inexpensive laser which can be easily installed in an engineering, design, research laboratory or model shop environment. In effect, the apparatus 20' would be another computer output peripheral analogous to a printer or plotter.

With the apparatus 20', the plastic ribbon 28' coated on the top with a pressure sensitive adhesive is fed from a roll 190. A mechanism which consists of several rollers 88 will remove the surface protecting tape 86 which is provided to protect the surface of the plastic ribbon 28' covered with adhesive. When the tape 86 has been removed, the laser beam 50' will cut the individually contoured laminations 24' in accordance with the sequence described hereinabove.

With the apparatus 20' in FIG. 14, the portions cut from the plastic ribbon 28' will drop on the conveyor belt 84. Those portions comprising the individually contoured laminations 24' that are to be attached to the stack at the stacking platform 90 will be advanced by the conveyor belt 84 over a certain distance and positioned under the stacking platform 94. Additionally, those portions to be discarded will be advanced by the conveyor belt 84 until they drop into a scrap container.

After an individually contoured lamination 24' is positioned under the stacking platform 94, the stacking platform 94 moves down until the stacking plate 92 presses the stack to the individually contoured lamination 24' to be attached. The load cell 96 transmits feedback about the load, and the amount of the load necessary to attach a particular individually contoured lamination 24' is calculated by a computer. In this manner, an adhesive bond develops between the individually contoured lamination 24' and the remainder of the stack, and the lamination 24' stays attached to the stack when the stack moves up with the stacking platform 94.

With regard to the embodiment illustrated in FIG. 8, the apparatus 20" comprises an automated production line utilizing the principles of the present invention. All of work stations 30a", 30b", 30c", 30d" etc. can cut cross-sections from metal or plastic simultaneously and can either share the same ribbon as shown in FIG. 8, or can have an arrangement similar to the one shown in FIGS. 7 and 14 where individual ribbon feeders are provided for each substation positioned perpendicularly to a common carrying conveyor. After all of the individually contoured laminations 24" have been cut, the conveyor 192 moves them one-by-one to the unloading substation 194 where they are removed to the stacking station 38" in the previously described manner.

With this embodiment, there is no physical limit to the number of work stations 30a", 30b", 30c", 30d" etc. which can be installed in the automated production line. In addition, a number of such work stations can be powered by the same laser beam generating device 34" by providing the laser beam 50" by means of beam splitters 98, 100, 102, 104 etc. In addition, all of such work stations can share the same computer assisted drafting station 36", conveyor belt 192, and stacking station 38" to produce both plastic and metal parts.

Figure 10:
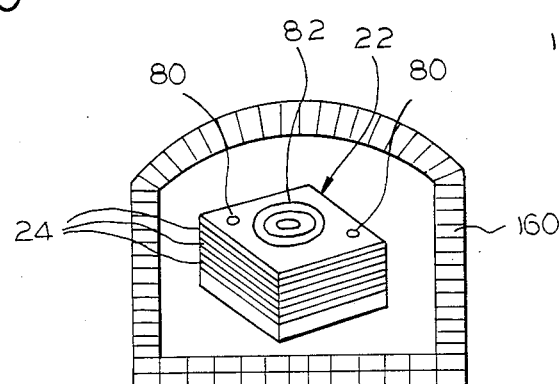
FIG. 10 is a perspective view of a plotter for producing artwork required for chemical etching the required shapes for individually contoured laminations for an integral three-dimensional object.
Figure 11:
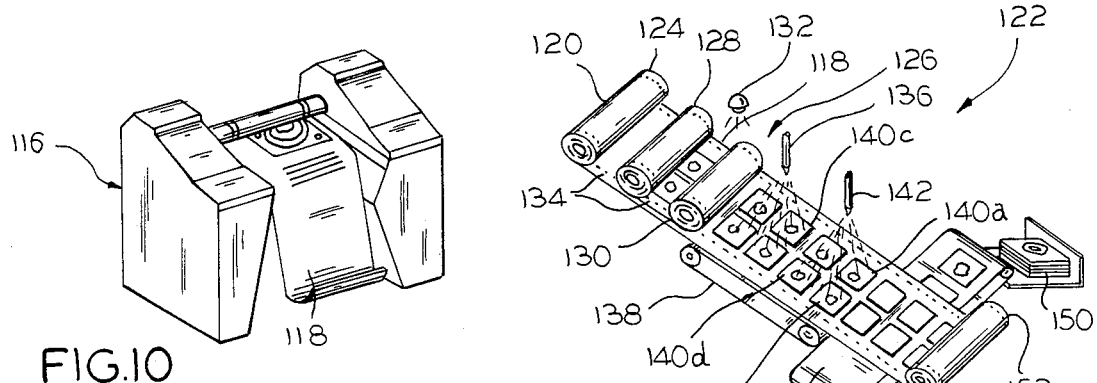
FIG. 11 is a perspective view of chemical etching after selective exposure of a sheet-like material to ultraviolet light through the plotter generated artwork.

With regard to the system represented in FIGS. 10 and 11, a chemical etching process is utilized to automatically produce composites. The three-dimensional composites can comprise specialized parts, dies, molds, product prototypes and other objects which can be described as geometrically bounded shapes. Basically, FIGS. 10 and 11 are representative of a process and apparatus that utilizes a number of advances.

In particular, advances in the field of polymer science have lead to the creation of molded parts with such good mechanical properties that they are directly replacing metal parts. By contrast, dies and molds are now produced primarily by machining blocks of steel with milling machines and other conventional and numerically controlled machine tools. With the present invention, an entirely new method for manufacturing dies and molds is provided which takes advantages of the advances in the field of polymer science.

In this connection, chemical etching or machining is a process in which material is removed by chemical and electrochemical dissolution of preferentially exposed surfaces of a work piece. This process, which is also known as chemical milling, photo fabricating and photo etching, possesses many technical and economical advantages in the manufacture of flat metal components. Parts of intricate design, such as computer chips and printed circuit boards, are produced by this method.

Because the metal is removed not only very precisely but also without the use of mechanical force and heat, problems of dross, burned edges, stress, strain, warping and burrs are avoided. The tooling costs are small compared with conventional or numerical control tooling and time costs are reduced because of the comparatively rapid turnarounds which can be achieved. Many materials can be chemically milled, including aluminum, nickel, brass, copper, stainless steel, spring steel and molybdenum.

The making of a laminated mold or die with the use of chemical milling or etching is illustrated in FIGS. 10 and 11. The mold or die design is created and then cross-sectioned at a computer assisted drafting station and the distance between cross-sections or laminations as specified to be the same as the thickness of the sheet material which is to be used. In addition, the geometry of each of the individually contoured laminations is transmitted to a specified plotter 116 which is particularly well suited to the production of filled areas.

If multiple plotters such as 116 are used, then multiple individually contoured laminations for the three-dimensional object can be manufactured simultaneously. Thus, the critical production path elapsed time depends upon a number of plotters such as 116 used for production of individually contoured laminations. For instance, if each of the individually contoured laminations require 3.5 minutes and if 10 such plotters are employed, the art work required for production of a four inch thick part can be generated within two hours.

As previously suggested, each of the individually contoured laminations will be drawn as a negative image with white against a dark background. The background areas will be chemically removed in a subsequent etching process (as shown in FIG. 11), and the negatives can be produced on paper or mylar. In this connection, mylar could be directly attached to or produced directly on the surface of metal sheets coated with a photo resistant material for exposure to ultraviolet light.

To perform the steps for chemical blanking, the application of a photoresistant material can be done on a large quantity basis as long as the sheets are stored and handled with care in preparation of work pieces. Exposure and etching operations are fairly fast, e.g., for a sheet of metal 0.01 inch thick, it will take from 10 to 30 minutes to do bath etching. Since all cross-sections can be etched simultaneously, the process is principally dependant upon the art work production.

After the etching has been completed and the photoresistant material has been removed, the sheets must be stacked together and laminated in a brazing furnace. Upon completion of the brazing process, a monolithic die, mold, prototype or other object will exist from the three-dimensional object formed from the individually contoured laminations. Depending upon the final application for the object, surface coating or finishing can be performed as previously described.

As shown in FIG. 5, the brazed part will have a step-like geometry, but the step edges can be eliminated by grinding before the surface is coated. As previously mentioned, the surface can be coated using the electroless nickel process or other finishing technique to achieve desired tolerances and surface finishes.

With regard to the sheet-like material utilized for the individually contoured laminations in the laser cutting process and the chemical etching process, it will be understood that this is preferably a "bimaterial" meaning that it is comprised of more than a single material. For instance, it may comprise a bimetallic material such as steel clad with copper, or it may comprise a metal covered with adhesive, or it may comprise a plastic covered with adhesive, depending upon the exact process utilized, i.e., whether the individually contoured laminations will be integrally bonded by means of brazing or through applied pressure. In addition, either or both sides of the principal portion of the sheet-like material may be suitably covered with the bonding material.

As mentioned previously in connection with the utilization of a bimetallic material, the principal material will comprise on the order of 70 to 98% of the sheet-like material with the bonding material comprising on the order of 2 to 30% of the sheet-like material. It will be appreciated, of course, that in the case of a bimetallic material, the principal material should have a melting point sufficiently higher than the bonding material so that the principal material will not deform during brazing. Similarly, in the case of an adhesive bond, there will be sufficient adhesive to create a strong bond following the application of pressure.

In order to form an integral three-dimensional object from individually contoured laminations, it is highly desirable for the individually contoured laminations to have the same or gradually varying shape. This can be achieved provided that each of the individually contoured laminations comprises no more than approximately 0.125% of the entire thickness of the integral three-dimensional object, e.g., approximately 0.030 inches maximum thickness for an integral three-dimensional object up to approximately 2 feet thick. By following these parameters, the contour will be relatively smooth and require a minimum of grinding prior to plating.

Figure 16:
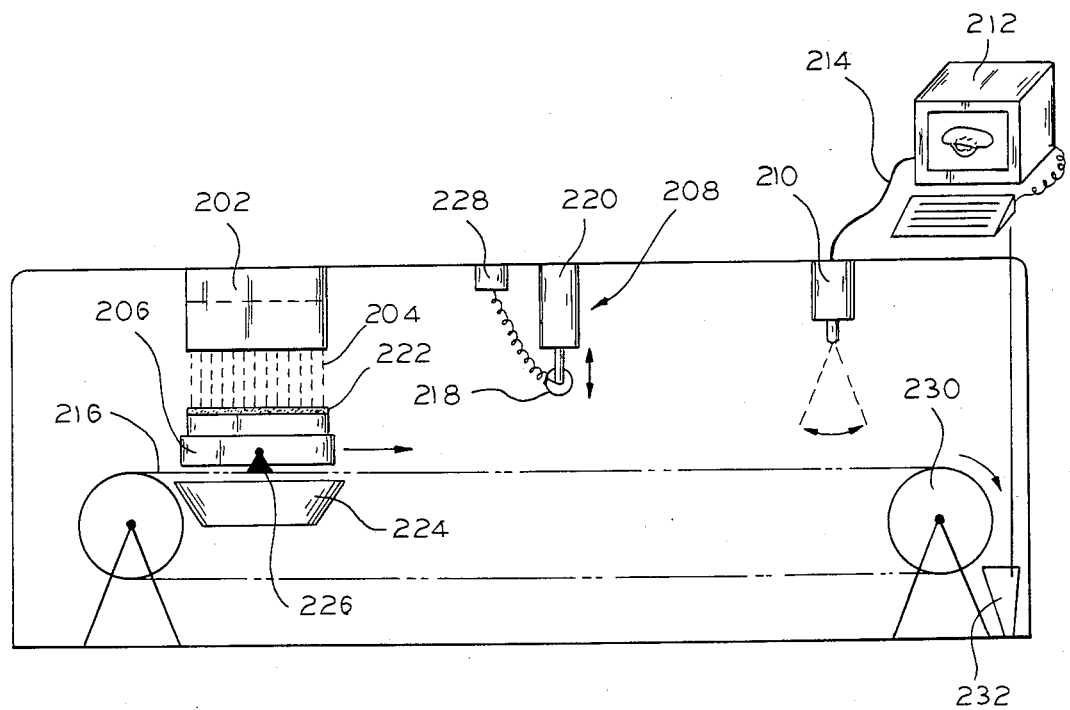
FIG. 16 is a side elevational view of an apparatus for forming an integral three-dimensional object from individually contoured laminations utilizing a powder material.

Referring now to FIG. 16, still another apparatus 200 for forming an integral three-dimensional object from laminations is illustrated and includes a station 202 for storing and supplying a powder material 204. The lamination forming means includes a powder receiving platform 206, means 208 for compressing the powder 204 on the platform 206 to a predetermined thickness, and means 210 for integrally bonding at least some of the powder 204 to complete formation of one of the individually contoured laminations. The operation controlling means includes a computer assisted drafting station 212 for entering data concerning the three-dimensional object and means 214 for transferring operation controlling signals to the lamination forming means. The lamination assembling includes means 216 for moving the powder receiving platform 206 in cyclical fashion from the powder storing and supplying station 202 to the powder compressing means 208 and to the integral bonding means 210. Preferably, the powder compressing means 208 includes a heated roller 218 controlled by an actuator 220 regulated to control the force of the roller 218 on the powder 204 to achieve bonding during compression.

As will be appreciated from FIG. 16, the integral bonding means 210 preferably comprises a computer interfaced laser scanner. The computer interfaced laser scanner 210 is adapted to integrally bond at least some of the powder 204 formed into a layer as at 222 on the platform 206 which is compressed by the roller 218. After this has been done, the integrally bonded powder comprises one of the individually contoured laminations.

As will be appreciated, the platform moving means 216 is a conveyor. Also, the station 202 for storing and supplying the powder is preferably disposed above an upper surface of the conveyor 216. In addition, a recirculation container 224 is preferably disposed below the upper surface of the conveyor 216.

As shown, the platform 206 is preferably attached to the conveyor 216 by pivotal side support mountings 226. The platform 206 receives the powder 204 so as to form the layer 222 while it is disposed below the container 202 with any excess falling into the recirculation container 224 for periodic recirculation back into the station 202. After the powder deposition on the platform 206, the conveyor 216 moves the platform 206 under the roller 218.

As this occurs, the roller 218 is brought into contact with the powder layer 222 by action of the linear actuator 220. The roller 218 is preferably electrically heated from a power supply 228 with the force of the actuator 220 being regulated in order to achieve proper bonding during compression of the powder layer 222. As will be appreciated, the roller 218 has the advantage of having a small area of contact with the powder layer 222 meaning that a relatively small force from the actuator 220 is required to achieve the desired pressure.

Next, the conveyor 216 moves the platform 206 under the computer interfaced laser scanner 210. The scanner sinters or melts the material within the boundaries of the cross-section designated by the computer assisted drafting station 212 to form the required one of the individually contoured laminations. Then, the platform 206 is moved around the drum 230 of the conveyor 216 (with excess powder 204 falling into the container 232) after which the platform 206 returns to a position under the station 202 for repeating the process to form the next of the individually contoured laminations.

Clearly, the apparatus 200 illustrated in detail in FIG. 16 demonstrates that powder techniques can be utilized for laminated object manufacturing. In this process, smaller laser beam intensity is required in comparison with cross-section cutting techniques, such as those described hereinabove. Instead of vaporizing metal or plastic (as occurs in cutting), the material only has to be selectively heated to a temperature that creates intermolecular bonds.

At such temperatures, sintering or melting of particles of material occurs. The apparatus 200 implementing this powder process is simpler, e.g., than laminating objects from foil, since cross sections are created and attached to the stack at the same time. Moreover, by utilizing this technique, problems associated with non-contiguous contours are entirely avoided.

Figure 15:
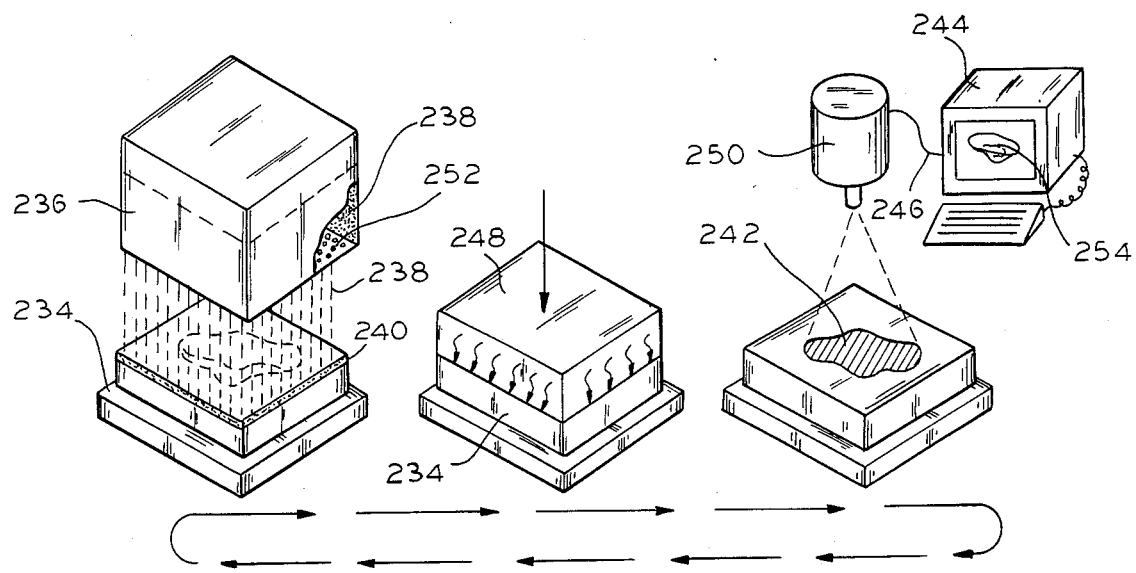
FIG. 15 is a schematic illustration of a method of forming an integral three-dimensional object from individually contoured laminations utilizing a powder material.

Referring specifically to FIG. 15, another method of forming an integral three-dimensional object from laminations is illustrated. The method includes the steps of positioning a platform 234 under a station 236 for storing and supplying a powder material 238, depositing a quantity of the powder material 238 on the platform 234 to form a layer 240 of the powder material 238 of a predetermined thickness, compressing the layer 240 of the powder material 238 to cause the powder material to be formed into a coherent mass, heating at least a portion of the layer 240 of the powder material 238 to form an individually contoured lamination 242, and repeating the depositing, compressing and heating steps to form a plurality of individually contoured laminations (such as 242). With this method, the individually contoured laminations such as 242 are each integrally bonded to the next adjacent of the individually contoured laminations by the heating steps.

Preferably, the method includes forming the individually contoured laminations such as 242 to a thickness substantially the same as the thickness of the layers such as 240. It also includes providing means for controlling the depositing, compressing and heating steps to provide the individually contoured laminations such as 242 for the three dimensional object to be formed thereby. It further includes entering data concerning the three-dimensional object into the controlling means and thereafter instructing the controlling means to cause the powder material 238 to be formed into the individually contoured laminations such as 242 for the three-dimensional object. More specifically, the controlling means preferably includes a computer assisted drafting station 244 for the data entering step and means 246 for transferring controlling signals therefrom.

With reference to the apparatus and method illustrated in FIGS. 15 and 16, the layers such as 240 of the powder material 238 are each of a thickness on the order of 0.002 to 0.020 inches after the compressing step. It will also be appreciated that the compressing step is performed either by the heated roller 218 (FIG. 16) or by a heated press platform 248 (FIG. 15). In either case, the heated portion of the layer 222 or 240 is heated by a computer interfaced laser scanner 210 or 250 adapted to integrally bond at least some of the powder material 204 or 238.

In addition, it will be appreciated that the powder material remaining after formation of the three-dimensional object formed by the integrally bonded individually contoured laminations is removed. This can be done as illustrated in FIG. 16 by a "dumping" method or, alternatively, by subjecting the respective platforms 206 and 234 to vibrations and/or impact. In this manner, the non-sintered or non-melted powder surrounding the three-dimensional object and filling its holes and cavities is loosened and leaves the part.

Finally, and referring to FIG. 15, the method can utilize metal, plastic or ceramic powder 238. The powder 238 flows out of the container 236 through sieve 252 and this deposition process can be enhanced by vibrating the container 236. Preferably, the platform 234 stays in this position until the powder layer 240 of desired thickness is deposited.

As previously mentioned, the powder layer 222 or 240 is compressed by the action of the heated roller 218 or heated press platform 248. At this stage, some intermolecular bonds are formed and the powder layer 222 or 240 is attached to the platform 206 or 234 or to the next adjacent layer where one or more layers has already been formed. Although the bonds are fairly weak, the compressed powder 204 or 238 stays attached even if the platform 206 or 234 is turned upside-down.

Referring to FIG. 15 in particular, the image of the cross-section 254 on the computer assisted drafting station 244 is rasterized by a computer. The geometrical information about the cross-section 254 is transmitted from the computer to the computer interfaced laser scanner 250 which scans the surface of the compressed powder 238 within the boundaries of the cross-section with a laser beam. Further, the laser beam is automatically focused on the surface of the cross-section, its energy is delivered in pulses (one pulse per raster dot), and the pulse energy is regulated in order to sinter or melt the material to the depth equal to the thickness of the cross-section.

With reference to the description of FIGS. 15 and 16, the apparatus can suitably become a computer peripheral for tool-less manufacturing of virtually any part that can be created on the computer screen. Although some secondary surface finishing of a three-dimensional object produced by the apparatus may be required, the apparatus results in an ideal method for near-net-shape manufacturing.

While in the foregoing specification a detailed description of the preferred embodiments has been set forth, it will be appreciated by those skilled in the art that the details herein given may be varied without departing from the spirit and scope of the appended claims.

I claim:

1. An apparatus for forming an integral three-dimensional object from laminations, comprising:
a station for storing and supplying a material;

means for forming said material into a plurality of individually contoured laminations in shapes required for assembly in a pre-selected sequence into said three-dimensional object;

means for controlling the operation of said lamination forming means to provide said individually contoured laminations for said three-dimensional object in response to data entered concerning said three-dimensional object; and means for assembling said plurality of individually contoured laminations formed from said material in said pre-selected sequence into the form of said three-dimensional object;

said plurality of individually contoured laminations being assembled such that each of said individually contoured laminations is integrally bonded to the next adjacent of said individually contoured laminations to complete formation of said integral three-dimensional object.

2. The apparatus as defined by claim 1 wherein said material stored and supplied at said station is a sheet material.

3. The apparatus as defined by claim 2 wherein said lamination forming means includes a work station having a position for cutting said sheet material and means for cutting said sheet material into said required shapes at said cutting position.

4. The apparatus as defined by claim 3 wherein said cutting means includes a laser beam generating device operatively associated with said work station, means for focusing a laser beam from said generating device onto said sheet material at said cutting position, and means for directing said laser beam from said generating device about said sheet material to form said required shapes at said cutting position.

5. The apparatus as defined by claim 4 wherein said means for focusing and directing said laser beam includes a lens and a pair of mirrors, said mirrors being spaced from said generating device, said lens and one another, said means for directing said laser beam including a positioning table supporting said mirrors for axial movement along mutually perpendicular axes.

6. The apparatus as defined by claim 5 wherein said positioning table supports one of said mirrors for movement toward and away from said generating device, said positioning table supporting the other of said mirrors for movement with said one of said mirrors, said positioning table also supporting the other of said mirrors for movement toward and away from said one of said mirrors.

7. The apparatus as defined by claim 6 wherein said mirrors move in a plane generally parallel to the plane of said sheet material at said cutting position, said positioning table supporting said lens for movement with the other of said mirrors such that said lens is adapted to move with said mirrors in a plane generally parallel to the plane of said mirrors, said lens also being supported to move along an axis generally perpendicular to the plane of said mirrors.

8. The apparatus as defined by claim 2 wherein said operation controlling means includes a computer assisted drafting station for entering data concerning said three-dimensional object and means associated with said computer assisted drafting station for transferring operation controlling signals to said lamination forming means.

9. The apparatus as defined by claim 8 including means associated with said computer assisted drafting station for determining the thickness of said individually contoured laminations, for determining the individual contours of each of said individually contoured laminations, for determining the sequence of forming said individually contoured laminations, and for determining the sequence of assembling said individually contoured laminations into said three-dimensional object.

10. The apparatus as defined by claim 9 wherein said determining means is operative to ensure for each of said individually contoured laminations that, after the thickness and individual contours have been determined, the sequence of forming said individually contoured laminations is such that each of the individual contours does not contain any other included contour.

11. The apparatus as defined by claim 3 wherein said lamination assembling means includes an assembly station having a location for stacking said individually contoured laminations and means for moving said individually contoured laminations from said cutting position of said work station to said stacking location of said assembly station.

12. The apparatus as defined by claim 11 wherein said moving means is an electromagnetically operated pick-up plate movable between said cutting position of said work station and said stacking location of said assembly station, said sheet material being a sheet metal ribbon stored on a roll at said station and including a feeding mechanism for advancing said ribbon from said roll to said cutting position of said work station.

13. The apparatus as defined by claim 12 including a grinding belt intermediate said cutting position of said work station and said stacking location of said assembly station, said pick-up plate being adapted to place said individually contoured laminations in contact with said grinding belt during movement from said cutting position of said work station to said stacking location of said assembly station.

14. The apparatus as defined by claim 12 wherein said assembly station includes a spring biased stacking plate at said stacking location, said stacking plate being disposed for axial movement in a stack holder adapted to receive and retain said individually contoured laminations on said stacking plate, said stack holder being adapted for limited movement in a plane parallel to the plane of said stacking plate.

15. The apparatus as defined by claim 14 wherein said stack holder includes a retaining lip adapted to cooperate with said spring biased stacking plate to retain said individually contoured laminations therebetween, said individually contoured laminations each having an identical generally rectangular outer contour, said stacking plate, stack holder and retaining lip cooperating with said generally rectangular outer contour to assemble said individually contoured laminations into the form of said three-dimensional object.

16. The apparatus as defined by claim 15 wherein said stacking plate includes a pair of locating pins adapted to precisely position said individually contoured laminations into the form of said three-dimensional object, said individually contoured laminations each having a pair of pin-receiving locating holes in said generally rectangular outer contour outwardly of any inner contour thereof.

17. The apparatus as defined by claim 12 wherein said cutting means includes a laser beam generating device operatively associated with said work station, means for focusing a laser beam from said generating device onto said sheet material at said cutting position, and means for directing said laser beam from said generating device about said sheet material to form said required shapes at said cutting position, said means for focusing said laser beam including a lens, said means for directing said laser beam including a pair of mirrors, said mirrors being spaced from said generating device, said lens and one another, said means for directing said laser beam including a positioning table supporting said mirrors for axial movement along mutually perpendicular axes.

18. The apparatus as defined by claim 17 wherein said positioning table supports one of said mirrors for movement toward and away from said generating device, said positioning table supporting the other of said mirrors for movement with said one of said mirrors, said positioning table also supporting the other of said mirrors for movement toward and away from said one of said mirrors, said mirrors moving in a plane generally parallel to the plane of said sheet material at said cutting position, said positioning table supporting said lens for movement with the other of said mirrors such that said lens is adapted to move with said mirrors in a plane generally parallel to the plane of said mirrors, said lens also being supported to move along an axis generally perpendicular to the plane of said mirrors.

19. The apparatus as defined by claim 18 wherein said electromagnetically operated pick-up plate is operatively associated with the lens supporting portion of said positioning table, said pick-up plate being adapted to be placed in contact with said individually contoured laminations at said cutting position of said work station to be electromagnetically attached thereto, said positioning table being adapted to move said individually contoured laminations from said cutting position of said work station to said stacking location of said assembly station, said individually contoured laminations thereafter being adapted to be released from said pick-up plate at said stacking location of said assembly station.

20. The apparatus as defined by claim 19 including integral bonding means for said plurality of individually contoured laminations, said integral bonding means comprising spot brazing of said individually contoured laminations with said laser beam generating device.

21. The apparatus as defined by claim 11 wherein said moving means is a conveyor belt for transporting said individually contoured laminations from said cutting position of said work station to said stacking location of said assembly station, said material being a sheet plastic ribbon having a pressure sensitive adhesive on the top thereof covered with a surface protecting tape, and including means for removing said tape before said plastic ribbon enters said cutting position of said work station.

22. The apparatus as defined by claim 21 wherein said assembly station comprises a stacking device including a movable plate at a stacking location, said plate being disposed on a stacking platform for axial movement to press individually contoured laminations assembled on said plate to the next adjacent individually contoured lamination carried from said cutting position of said work station to said stacking location of said assembly station, and including a load cell associated with said plate to ensure a force sufficient to cause an adhesive bond between said individually contoured laminations.

23. The apparatus as defined by claim 2 wherein said lamination forming means includes a plurality of work stations each having a position for cutting said sheet material and means for cutting said sheet material into said required shapes at said cutting positions, said cutting means including a single laser beam generating device operatively associated with each of said work stations through a beam splitter, said cutting means also including means for directing and focusing laser beams from said beam splitters onto said sheet material at said cutting positions.

24. The apparatus as defined by claim 23 wherein said lamination assembling means includes a single assembly station having a location for stacking said individually contoured laminations from all of said work stations and means for moving said individually contoured laminations from said cutting positions of said work stations to said stacking location of said single assembly station.

25. The apparatus as defined by claim 2 wherein said lamination forming means includes a plotter for producing said required shapes as a negative image on a separate sheet material for use as artwork for chemical etching said sheet material for said integral three-dimensional object, said sheet material for said integral three-dimensional object comprising a sheet coated with a photoresistant material for exposure to ultraviolet light, said lamination forming means further including an etching station to receive said coated sheet after attachment of said separate sheet material bearing said negative image.

26. The apparatus as defined by claim 25 wherein said separate sheet material used as artwork is a ribbon having areas transparent to passage of ultraviolet light, said ribbon being moved at the same speed as said sheet material for said three-dimensional object, said ribbon preferentially exposing said sheet material for said three-dimensional object to ultraviolet light.

27. The apparatus as defined by claim 25 wherein said separate sheet material used as artwork and said sheet material for said three-dimensional object have perforations adapted to cooperate with sprockets for equalizing the speeds thereof.

28. The apparatus as defined by claim 25 wherein said separate sheet material used as artwork contains artwork for more than one of said individually contoured laminations in a single row.

29. The apparatus as defined by claim 25 including a conveyor moving parallel to the direction of movement of said sheet material used as artwork and said sheet material for said three-dimensional object and also including another conveyor moving in a direction perpendicular to the direction of movement of said first conveyor for transporting said individually contoured laminations to a stack.

30. The apparatus as defined by claim 2 wherein said lamination forming means includes a plotter for producing said required shapes for use as artwork for chemical etching directly on said sheet material for said integral three-dimensional object, said sheet material for said integral three-dimensional object comprising a sheet coated with a photoresistant material for exposure to ultraviolet light, said lamination forming means further including an etching station to receive said coated sheet after said negative image has been produced directly on said sheet material.

31. The apparatus as defined by claim 2 wherein said sheet material is a bimaterial ribbon sized such that any single one of said individually contoured laminations comprises no more than 0.125% of the total thickness of said integral three-dimensional object defined by all of said individually contoured laminations.

32. The apparatus as defined by claim 1 wherein said material stored and supplied at said station is a powder based material.

33. The apparatus as defined by claim 32 wherein said lamination forming means includes a powder based material receiving platform, means for compressing said powder based material on said platform to a predetermined thickness, and means for delivering concentrated energy to change a property of at least some of said powder based material to complete formation of one of said individually contoured laminations and to facilitate separation of the remainder of said powder based material from said individually contoured lamination.

34. The apparatus as defined by claim 33 wherein said operation controlling means includes a computer assisted drafting station for entering data concerning said three dimensional object and means associated with said computer assisted drafting station for transferring operation controlling signals to said lamination forming means.

35. The apparatus as defined by claim 34 wherein said lamination assembling means includes means for performing cyclical movement between said powder based material receiving platform and said powder based material storing and supplying station, and said powder based material compressing means and said concentrated energy delivering means.

36. the apparatus as defined by claim 32 wherein said powder based material compressing means includes a roller, said roller being controlled by an actuator, said actuator being regulated to control the force of said roller on said powder based material to achieve bonding during compression.

37. The apparatus as defined by claim 33 wherein said concentrated energy delivering means includes a computer interfaced laser scanner, said computer interfaced laser scanner being adapted to change a property of at least some of said powder based material, at least some of said powder based material thereafter comprising one of said individually contoured laminations.

38. The apparatus as defined by claim 35 wherein said cyclical movement means is a conveyor, said station for storing and supplying said powder based material is disposed above an upper surface of said conveyor, and including a recirculation container disposed below said upper surface of said conveyor.

39. A method of forming an integral three-dimensional object from laminations, comprising the steps of:
providing means for forming a material into a plurality of individually contoured laminations in shapes required for assembly in a pre-selected sequence into said three-dimensional object;
providing means for controlling the operation of said lamination forming means to provide said individually contoured laminations for said three-dimensional object;
entering data concerning said three-dimensional object into said operation controlling means and thereafter instructing said operation controlling means to operate said lamination forming means in a controlled manner so as to form said plurality of individually contoured laminations; and
assembling said plurality of individually contoured laminations in said pre-selected sequence into the form of said three-dimensional object;
said plurality of individually contoured laminations being assembled such that each of said individually contoured laminations is integrally bonded to the next adjacent of said individually contoured laminations to complete formation of said three-dimensional object.

40. The method as defined by claim 39 including the step of providing a station for storing and supplying said material, said material comprising a sheet material.

41. The method as defined by claim 40 wherein said lamination forming means includes a work station having a position for cutting said sheet material and means for cutting said sheet material into said required shapes at said cutting position.

42. The method as defined by claim 39 wherein any one of said individually contoured laminations is sized so as to comprise no more than 0.125% of the thickness of said integral three-dimensional object defined by all of said individually contoured laminations.

43. The method as defined by claim 41 wherein said cutting means includes a laser beam generating device operatively associated with said work station, means for focusing a laser beam from said generating device onto said sheet material at said cutting position, and means for directing said laser beam from said generating device about said sheet material to form said required shapes at said cutting position.

44. The method as defined by claim 39 wherein said operation controlling means includes a computer assisted drafting station for entering data concerning said three-dimensional object and means associated with said computer assisted drafting station for transferring operation controlling signals to said lamination forming means.

45. The method as defined by claim 44 including the step of providing means associated with said computer assisted drafting station for determining the thickness of said individually contoured laminations, for determining the individual contours of each of said individually contoured laminations, for determining the sequence of forming said individually contoured laminations, and for determining the sequence of assembling said individually contoured laminations into said three-dimensionl object.

46. The method as defined by claim 45 wherein said determining means is operative to ensure for each of said individually contoured laminations that, after the thickness and individual contours have been determined, the sequence of forming said individually contoured laminations is such that each of the individual contours does not contain any other included contour.

47. The method as defined by claim 41 wherein said assembling step includes providing a location for stacking said individually contoured laminations, moving said individually contoured laminations from said cutting position of said work station to said stacking location, and stacking said individually contoured laminations into the form of said three-dimensional object.

48. The method as defined by claim 47 wherein said individually contoured laminations are provided with a pair of pin-receiving locating holes for aligning said individually contoured laminations with respect to one another.

49. The method as defined by claim 47 wherein said individually contoured laminations are formed such that any non-contiguous portions are connected by at least one connecting strip.

50. The method as defined by claim 47 including the step of integrally bonding said plurality of individually contoured laminations, said integral bonding step including furnace brazing said integral three-dimensional object and said connecting strips being removed after said furnace brazing.

51. The method as defined by claim 47 wherein each of said individually contoured laminations include an outer periphery of constant size and shape, each of said individually contoured laminations also being provided with at least two pin-receiving locating holes adjacent said outer periphery.

52. The method as defined by claim 47 including the step of grinding said individually contoured laminations after cutting said required shapes at said cutting position of said work station prior to stacking said individually contoured laminations at said stacking location.

53. The method as defined by claim 40 including the step of integrally bonding said plurality of individually contoured laminations, said integral bonding step including spot brazing said individually contoured laminations.

54. The method as defined by claim 53 wherein said integral bonding step includes thereafter furnace brazing said three-dimensional object.

55. The method as defined by claim 54 including the step of grinding the three-dimensional object after furnace brazing.

56. The method as defined by claim 54 including the step of plating the three-dimensional object after furnace brazing.

57. The method as defined by claim 47 wherein said sheet material is a sheet ribbon having a pressure sensitive adhesive on the top thereof covered with a surface protecting tape, and including the step of removing said tape before said ribbon enters said cutting position of said work station.

58. The method as defined by claim 41 including pressing individually contoured laminations located at said stacking location to the next adjacent individually contoured lamination moved from said cutting position of said work station to said stacking location to cause an adhesive bond between said individually contoured laminations.

59. The method as defined by claim 41 including the step of providing a plurality of work stations each having a position for cutting said sheet material and including the step of providing means for cutting said sheet material into said required shapes at each of said cutting positions, said cutting positions including a single laser beam generating device operatively associated with each of said work stations through a beam splitter, said cutting means also including means for directing and focusing laser beams from said beam splitters onto said sheet material at said cutting positions.

60. The method as defined by claim 59 wherein said assembly step includes providing a single location for stacking said individually contoured laminations, moving said individually contoured laminations from said cutting positions of said work stations to said single stacking location, and stacking said individually contoured laminations into the form of said three-dimensional object.

61. The method as defined by claim 60 wherein said operation controlling means includes a computer assisted drafting station for entering data concerning said three-dimensional object and means associated with said computer assisted drafting station for transferring operation controlling signals to said lamination forming means.

62. The method as defined by claim 61 including the step of providing means associated with said computer assisted drafting station for determining the thickness of said individually contoured laminations, for determining the individual contours of each of said individually contoured laminations, for determining the sequence of forming said individually contoured laminations, and for determining the sequence of assembling said individually contoured laminations into said three-dimensional object.

63. The method as defined by claim 62 wherein said determining means is operative to ensure for each of said individually contoured laminations that, after the thickness and individual contours have been determined, the sequence of forming said laminations is such that each of the individual contours does not contain any other included contour.

64. The method as defined by claim 58 including the step of utilizing a plotter for producing said required shapes as a negative image on a separate sheet material for use as artwork for chemical etching said sheet material for said integral three-dimensional object, said sheet material for said integral three-dimensional object comprising a bimaterial sheet coated with a photoresistent material for exposure to ultraviolet light, and including the step of providing an etching station to receive said coated bimaterial sheet after covering with said separate sheet material bearing said negative image.

65. The method as defined by claim 64 wherein said separate sheet material used as artwork is a ribbon transparent to the passage of ultraviolet light, said ribbon being moved at the same speed as said bimaterial sheet, said ribbon preferentially exposing said bimaterial sheet to ultraviolet light.

66. The method as defined by claim 64 wherein said separate sheet material used as artwork and said bimaterial sheet have perforations adapted to cooperate with sprockets for equalizing the speeds thereof.

67. The method as defined by claim 64 wherein said separate sheet material used as artwork contains artwork for more than one of said individually contoured laminations in a single row.

68. The method as defined by claim 64 including a conveyor moving parallel to the direction of movement of said sheet material used as artwork and said bimaterial sheet and also including another conveyor moving in a direction perpendicular to the direction of movement of said first conveyor for transporting said individually contoured laminations to a stack.

69. The method as defined by claim 39 including the step of providing a station for storing and supplying said material, said material comprising a powder.

70. A method of forming an integral three-dimensional object from laminations, comprising the steps of:
positioning a platform in proximity to means for storing and supplying a powder based material;
forming a layer of said powder based material of a predetermined thickness by bringing a quantity of said powder based material into contact with said platform;
compressing said layer of said powder based material to cause said powder based material to be formed into a coherent mass;
utilizing means for delivering concentrated energy to change a property of at least a portion of said layer of said powder based material to form an individually contoured lamination and to facilitate separation of the remainder of said layer of said powder based material from said individually contoured lamination; and repeating said layer forming, compressing and utilizing steps to form a plurality of said individually contoured laminations;

each of said individually contoured laminations being integrally bonded to the next adjacent of said individually contoured laminations by at least one of said compressing and utilizing steps.

71. The method as defined by claim 70 wherein said individually contoured laminations are formed to a thickness substantially the same as the thickness of said layers of said powder based material.

72. The method as defined by claim 70 including the step of providing means for controlling said layer forming, compressing and utilizing steps to provide said individually contoured laminations for said three-dimensional object and to facilitate separation of the remainder of said layer of said powder based material from said three-dimensional object.

73. The method as defined by claim 72 including the step of entering data concerning said three dimensional object into said controlling means and thereafter instructing said controlling means to cause said powder based material to be formed into said individually contoured laminations.

74. The method as defined by claim 73 wherein said controlling means includes a computer assisted drafting station for said data entering step and means associated with said computer assisted drafting station for transferring controlling signals for said layer forming, compressing and utilizing steps.

75. The method as defined by claim 70 wherein said layers of said powder material are each of a thickness on the order of 0.002 to 0.020 inches after the step of compressing.

76. The method as defined by claim 70 wherein said layers of said powder based material are each compressed by a press platform.

77. The method as defined by claim 70 wherein said layers of said powder based material are each compressed by a roller.

78. The method as defined by claim 70 wherein the property of said portion of said layer is changed by a computer interfaced laser scanner, said computer interfaced laser scanner comprising said concentrated energy delivery means, said computer interfaced laser scanner being applied to change said property of at least some of said powder based material to facilitate separation of the remainder of said powder based material therefrom.

79. The method as defined by claim 70 including the step of removing the remainder of said powder based material from said three-dimensional object formed by said individually contoured laminations using the difference in properties of said powder based material created by said utilizing step.

80. The method as defined by claim 70 wherein said layer forming, compressing and utilizing steps are performed at different stations and including means for performing cyclical movement between said platform and said powder based material storing and supplying station, and said compressing station and said utilizing station.

* * * * *